United States Patent [19]

Tabata et al.

[11] Patent Number: 5,240,983
[45] Date of Patent: Aug. 31, 1993

[54] PROCESS FOR PRODUCING POLYOLEFIN THERMOPLASTIC ELASTOMER COMPOSITION

[75] Inventors: Nobuchika Tabata, Ichihara; Fumikazu Saito, Kisarazu; Hisao Iizuka; Yutaka Nozokido, both of Ichihara, all of Japan

[73] Assignee: Chisso Corporation, Ohsaka, Japan

[21] Appl. No.: 553,906

[22] Filed: Jul. 16, 1990

[30] Foreign Application Priority Data

Jul. 17, 1989 [JP] Japan .................. 1-184268

[51] Int. Cl.$^5$ .............. C08L 23/26; C08L 23/16; C08K 5/54; C08J 3/24
[52] U.S. Cl. .................. 524/261; 524/188; 524/262; 524/263; 524/264; 525/88; 264/211; 264/211.23; 264/211.24
[58] Field of Search .............. 524/262, 263, 264, 188; 525/88

[56] References Cited

U.S. PATENT DOCUMENTS

| | | | |
|---|---|---|---|
| 3,567,680 | 3/1971 | Iannicelli | 524/262 |
| 3,793,130 | 2/1974 | Marzocchi | 524/188 |
| 3,906,056 | 9/1975 | Okamoto et al. | 525/88 |
| 4,297,145 | 10/1981 | Wolff et al. | 524/263 |
| 4,363,885 | 12/1982 | Fukui et al. | 525/88 |
| 4,480,065 | 10/1984 | Kawai et al. | 525/88 |
| 4,547,310 | 10/1985 | Kasanami et al. | 524/262 |
| 4,565,738 | 1/1986 | Purdy | 525/88 |
| 4,690,959 | 9/1987 | Plueddemann | 524/262 |
| 4,774,293 | 9/1988 | Beijleveld et al. | 525/88 |
| 5,025,042 | 6/1991 | Yoshida et al. | 524/188 |
| 5,037,868 | 8/1991 | Saito et al. | 524/188 |

FOREIGN PATENT DOCUMENTS

| | | |
|---|---|---|
| 2856369 | 7/1980 | Fed. Rep. of Germany . |
| 3520106 | 12/1986 | Fed. Rep. of Germany . |
| 3520151 | 12/1986 | Fed. Rep. of Germany . |
| 1248256 | 10/1968 | United Kingdom .......... 524/264 |
| 2225328 | 11/1989 | United Kingdom .......... 524/188 |

Primary Examiner—Paul R. Michl
Assistant Examiner—Andrew E. C. Merriam
Attorney, Agent, or Firm—Fay, Sharpe, Beall, Fagan, Minnich & McKee

[57] ABSTRACT

A process for producing a polyolefin thermoplastic elastomer composition having superior rubbery elasticity, mechanical properties, etc. and also having improved processing fluidity, workability, etc. is provided, which process comprises blending (A) 40 to 80% by weight of an ethylene-propylene copolymer rubber and/or an ethylene-propylene-diene terpolymer, as a soft segment component, (B) 60 to 20% by weight of a crystalline ethylene-propylene block copolymer having an ethylene content of at least 5% by weight and a melt flow index of 0.5 to 30 g/10 minutes or a crystalline ethylene-propylene random copolymer having an ethylene content of at least 1.5% by weight and a melt flow index of 0.5 to 30 g/10 minutes, each as a hard segment, and based upon 100 parts by weight of the total of (A) and (B), (C) 0.3 to 5 parts by weight of an organosilane, (D) 0.1 to 3 parts by weight of an organic radical-generator, (E) 0 to 5 parts by weight of white carbon, and (F) 0 to 100 parts by weight of an extender oil, followed by subjecting the resulting blend to dynamic partial crosslinking.

8 Claims, No Drawings

PROCESS FOR PRODUCING POLYOLEFIN THERMOPLASTIC ELASTOMER COMPOSITION

BACKGROUND OF THE INVENTION

1. Field of the Invention

This invention relates to a process for producing a polyolefin thermoplastic elastomer composition. More particularly it relates to a process for producing a partially crosslinked polyolefin thermoplastic elastomer composition suitable to extrusion molding or injection molding for thick products.

2. Description of the Related Art

In the case of subjecting conventional rubbers to injection molding, there have been problems that since the process requires steps of blending additives into a rubber, kneading the resulting blend, filling into a mold and vulcanizing, a particular molding machine is required, the cycle time becomes longer and the steps are troublesome. In the case of the extrusion molding, too, similar problems have been raised. Thus, as a stock, a composition substituted for rubbers, which is moldable even without vulcanization and yet provided with rubbery properties has been researched. Among stocks having such properties, soft plastics such as soft vinyl chloride resin, ethylene-vinyl acetate resin, low density polyethylene, etc. are superior in the aspect of both moldability and softness, but on the other hand are inferior in the aspect of heat resistance, mechanical strengths, repellent elasticity, etc.; hence these plastics have been restricted in the use applications.

Thus, in recent years, as materials having intermediate properties between those of vulcanized rubbers and those of soft plastics, compositions comprising an olefin copolymer rubber and an olefin plastic have been noted among thermoplastic elastomers. Namely, research has been made around polypropylene and ethylene-propylene copolymer rubber, for example, a composition obtained by melt-kneading a polyolefin resin with an ethylene-propylene copolymer rubber, disclosed in Japanese patent application laid-open No. Sho 49-53938/1974, a composition having an improved impact strength, obtained by blending an olefin copolymer rubber with an olefin plastic at two stages, disclosed in Japanese patent application laid-open No. Sho 60-71652/1985, etc.

Among these compositions, olefin thermoplastic elastomers having the rubbery part therein partially crosslinked at the time of melt-kneading are so superior in the heat resistance and rubbery elasticity that development thereof has been advanced as a most promising composition. Partially crosslinked olefin thermoplastic elastomers have generally been produced by mechanically melt-kneading an olefin rubber such as ethylene-propylene copolymer rubber or ethylene-propylene-non-conjugated diene terpolymer rubber with polypropylene usually by means of Bambury mixer, kneader, etc. and at the same time adding a crosslinking agent such as organic peroxide, etc. to effect partial crosslinking. As such a process for obtaining thermoplastic elastomers, for example, the following have been proposed: a process of partially crosslinking the rubbery part at melt-kneading (Japanese patent publication No. Sho 53-34210/1977); a process of crosslinking the same by using an organic peroxide, (Japanese patent application laid-open No. Sho 57-172944/1982); a process of partially crosslinking the same by using divinylbenzene as a crosslinking auxiliary (Japanese patent application laid-open No. Sho 57-135846/1982), a process of completely vulcanizing the same with sulfur (Japanese patent application laid-open No. Sho 52-13541/1977); a process of using an organosilane (Japanese patent application laid-open No. Sho 57-23651/1982); etc.

However, compositions obtained by merely melt-kneading an olefin copolymer rubber and an olefin plastic are inferior in the heat resistance and mechanical strength and also inferior in the practical utility. Further, the process accompanied with crosslinking is superior in obtaining a product having a heat resistance, a rubbery elasticity and a mechanical strength, but inferior in the processing fluidity, resulting in an inferior appearance of the resulting molded product. Further, in the case of using an organosilane as a crosslinking auxiliary, a process of post-crosslinking by immersing in hot water in the presence of a catalyst such as dibutyltin dilaurate is required; hence there occurs a new problem of inferior processability.

SUMMARY OF THE INVENTION

The object of the present invention is to provide a process for producing a polyolefin thermoplastic elastomer composition having overcome the drawbacks of conventional melt-kneaded compositions of an olefin copolymer rubber and an olefin plastic, and having superior rubbery elasticity, mechanical properties, etc., and also having improved processing fluidity, processability, etc.

The present inventors have made extensive research in order to achieve the above object, and as a result, have found that when the components (A) to (F) described below are fed directly to a twin-screw extruder and dynamically partially crosslinked, a polyolefin thermoplastic elastomer having improved heat-resistance, mechanical strength, rubbery elasticity and processing fluidity is obtained, and have attained the present invention.

The present invention resides in:

a process for producing a polyolefin thermoplastic elastomer composition, which comprises blending (A) 40 to 80% by weight of an ethylene-propylene copolymer rubber and/or an ethylene-propylene-diene terpolymer, as a soft segment component, (B) 60 to 20% by weight of a crystalline ethylene-propylene block copolymer having an ethylene content of at least 5% by weight and a melt flow index of 0.5 to 30 g/10 minutes or a crystalline ethylene-propylene random copolymer having an ethylene content of at least 1.5% by weight and a melt flow index of 0.5 to 30 g/10 minutes, each as a hard segment, and based upon 100 parts by weight of the total of (A) and (B), (C) 0.3 to 5 parts by weight of an organosilane, (D) 0.1 to 3.0 parts by weight of an organic radical-generator exhibiting a half-life period of one minute at a temperature of 170° C. or higher, (E) 0 to 5 parts by weight of white carbon, and (F) 0 to 100 parts by weight of an extender oil, followed by subjecting the resulting blend to dynamic partial crosslinking.

DETAILED DESCRIPTION OF PREFERRED EMBODIMENTS

The main portion of the composition of the present invention is composed of a hard segment and a soft segment, and among these segments, the component constituting the soft segment is preferable to be an ethylene-propylene copolymer rubber (hereinafter referred to as EPM) having a Mooney viscosity $ML_{1+4}$ (100° C.) of 10 to 100 and a propylene content of 20 to 50% by weight, or an ethylene-propylene-diene terpolymer (hereinafter referred to as EPDM) having a Mooney viscosity $ML_{1+4}$ (100° C.) of 10 to 110, using as the third component diene to be copolymerized, any one of ethylidene, norbornene and 1,4-hexadiene, and having a iodine value (degree of unsaturation) of preferably 16 or less.

The component constituting the hard segment in the composition of the present invention is preferred to be a crystalline ethylene-propylene block copolymer having an ethylene content of at least 5% by weight and a melt flow index of 0.5 to 30 g/10 minutes. This copolymer is a crystalline ethylene-propylene block copolymer obtained by copolymerizing ethylene with propylene at two stages. In the first stage copolymerization, an ethylene-propylene copolymer (hereinafter referred to as polymer 1) having an ethylene content of 0 to 5% by weight is formed so as to occupy 20 to 95% by weight, preferably 50 to 95% by weight of the total quantity polymerized, and in the second stage copolymerization, an ethylene-propylene copolymer (hereinafter referred to as polymer 2) having an ethylene content of 50 to 85% by weight is formed so as to occupy 80 to 5% by weight, preferably 50 to 5% by weight of the total quantity polymerized. As a result, a crystalline ethylene-propylene block copolymer (hereinafter referred to as polymer 3) is obtained. In the case where the polymer 3 as the ultimate composition is used as the hard segment, the higher the proportion ratio of polymer 2 is, the more the quantity of the soft segment used as the component (A) can be reduced.

Further, as another hard segment, a crystalline ethylene-propylene random copolymer having an ethylene content of at least 1.5% by weight and a melt flow index of 0.5 to 30 g/10 minutes can be preferably used, too. This polymer is a crystalline ethylene-propylene random copolymer obtained by copolymerizing ethylene with propylene at one stage. In addition, propylene homopolymer is inferior in the compatibility with EPM or EPDM to reduce rubbery elasticity.

The organosilane compound (C) in the present invention refers to a silane expressed by the formula $RR'SiX_2$ wherein R represents an organic group including vinyl group, chloro group, amino group, mercapto group, glycidoxy group, methacryloxy group, etc., X represents a hydrolyzable organic group such as methoxy group, ethoxy group, etc., R' represents R or X and the respective Rs (in the case of two Rs) and the respective Xs may be different from each other. Examples of the silane are vinyltrimethoxysilane, vinyltriethoxysilane, 3-aminopropyltriethoxysilane, n-(2-aminoethyl)-3-aminopropyltrimethoxysilane, 3-glycydoxypropyltrimethoxysilane, 3-chloropropyltrimethoxysilane, 3-methacryloxypropyltrimethoxysilane, 3-mercaptopropyltrimethoxysilane, etc. Among these, 3-methacryloxypropyltrimethoxysilane is preferably used. The quantity of the organosilane compound blended is 0.3 to 5 parts by weight, preferably 1 to 3 parts by weight based upon 100 parts by weight of (A)+(B). If it is less than 0.3 part by weight, the improving effect is small, while if it exceeds 5 parts by weight, the processing fluidity lowers.

As the organic radical-generator used in the present invention, those having a half-life period of one minute at a temperature of 170° C. or higher are preferred. For example, di-t-butylperoxydiisopropylbenzene, 2,5-dimethyl-2,5-di-(t-butylperoxy)hexane, dicumyl peroxide, etc. are mentioned. The quantity of the organic radical-generator blended is 0.1 to 3 parts by weight, preferably 0.5 to 2 parts by weight based upon 100 parts by weight of (A)+(B). If it is less than 0.1 part by weight, the improving effect is small, while if it exceeds 3 parts by weight, the effect is saturated, and disadvantageous economically.

In the present invention, the crystalline ethylene-propylene block copolymer or the crystalline ethylene-propylene random copolymer, each used as the hard segment may be in a pellet form, but preferably in a powder form in the aspect of dispersibility.

It is desirable to blend white carbon into the composition of the present invention. Since X of the organosilane compound $RR'SiX_2$ used in the present invention is a hydrolyzable organic radical, a crosslinking reaction is liable to proceed with lapse of time due to moisture in air, etc., but when white carbon is added, it is possible to inhibit the crosslinking reaction with lapse of time, and it is also possible to stabilize the quality of the composition. Further, since the organosilane compound is a liquid, when it is mixed with the powder of the crystalline ethylene-propylene copolymers as the hard segment component, the mixture becomes so viscous that the quantity of the mixture fed to the extruder at the time of granulation varies to make the quality of the composition unstable, whereas, addition of white carbon overcomes such a defect. The quantity of white carbon blended is 0 to 5 parts by weight, preferably 0.3 to 2 parts by weight based upon the total 100 parts by weight of (A)+(B). Even if it exceeds 5 parts by weight, the effect is saturated, and the case is economically undesirable.

Further, an extender oil may be included in the composition of the present invention. This extender oil may be any of paraffin, naphthene and aromatic ones, and a paraffinic processing oil is most preferable in the aspects of hue, odor, etc. The quantity of the extender oil blended is 0 to 100 parts by weight, preferably 0 to 50 parts by weight based upon the total 100 parts by weight of (A)+(B). It may be added over 100 parts by weight, but the strength tends to lower.

In the present invention, the above components (A) to (F) are preliminarily mixed by means of Henschel mixer, tumbler mixer, etc. followed by dynamic partial crosslinking. This dynamic partial crosslinking refers to a process of extruding the mixture of the above (A) to (F) by means of a multi-screw extruder(twin- or three-screw) or milling by means of mill rolls to impart a shearing force of a definite value or more.

As to the shearing force at the time of using a multi-screw extruder, a specific energy W which corresponds to the shearing force and defined according to the following equation, may be in the range of 0.08 to 0.8, preferably 0.1 to 0.6:

$$W = \sqrt{3} \cdot (I - I_0) \cdot E \cdot \phi / 1000 \cdot Q$$

wherein W: specific energy (Kw Hr/Kg)
I: loaded current (A)
$I_O$: loaded current at the time of empty-driven screw (A)
E: voltage (V)
$\phi$: power factor Q: extruded quantity (Kg/hr)

Further, the parameters of the crosslinking conditions i.e. the quantity of the organosilane compound, the quantity of the organic radical-generator, the crosslinking temperature and the crosslinking time, are adjusted so as not to attain complete crosslinking. Whether or not a partial crosslinking to a desired extent has occurred in the composition can be judged, for example, by measuring the insolubles of partially crosslinked composition in xylene after reflux for 6 hours. The quantity of the insolubles in xylene that is a gel fraction is preferred to be 20 to 70%, preferably 30 to 60% and also to be larger by 10% or more, particularly 20% or more, than the quantity of uncrosslinked composition. Concretely, in the dynamic partial crosslinking using a twin-screw extruder, it is possible to achieve the object under the conditions of a temperature of 190° to 270° C., preferably 200° to 250° C. and a retention time of 20 to 180 seconds, preferably 50 to 120 seconds. In addition, in the case where a single-screw extruder by which a definite shearing force is not obtained is used, only a product having an inferior dispersibility of the soft segment and the hard segment and also having inferior physical properties is obtained.

The dynamically partially crosslinked composition can be processed or reprocessed by means of conventional processing machines for extrusion molding, injection molding, compression molding, etc.

In the above manner, it is possible to obtain a polyolefin thermoplastic elastomer superior in heat resistance, mechanical strength, rubbery elasticity and processing fluidity.

The thus obtained elastomer is melt-extruded and cut into a suitable form or pelletized in the case of using a multi-screw extruder. A manner of cutting the meltextrudate under water and a manner of mist-cutting the melt-extrudate while injecting water are preferred. Further, it is also possible to employ a hot-cutting manner.

The present invention will be described in more detail by way of Examples and Comparative examples, but it should not be construed to be limited thereto. The evaluation methods employed in Examples and Comparative examples were carried out according to the following methods:

1) MFR: Melt Flow Rate according to JIS K 7210,

| temperature: | 230° C. |
|---|---|
| load: | 2.16 or 10 kgf |
| unit: | g/10 min. |

2) 100% elongation set

| Tester: | Tensilon UTM-1 type |
|---|---|
| Test piece: | JIS K 7113 No. 1 test piece |
| Length between chacks: | 115 mm |
| Length between bench marks: | 50 mm |
| Tensile rate: | 200 mm/min. |

When the distance between the bench marks reached 100 mm, the test piece was kept for 10 minutes, followed by opening the chucks, allowing the test piece to stand still, measuring the length between the chucks and calculating the resulting elongation set according to JIS K 6301 (unit %).

3) Stress and elongation at tensile breaking point:

| Tester: | Strograph W 1 type |
|---|---|
| Test piece: | JIS K 7113 test piece No. 1, according to JIS K 7113 |
| Length between the chucks: | 115 mm |
| Length between bench marks: | 50 mm |
| Tensile rate: | 50 mm/min. (unit: stress kgf/cm², elongation %) |

4) Stress at 100% elongation:

Calculated from stress at 100% elongation at the time of measurement of 100% elongation set (unit: kgf/cm$^2$)

5) Flexural elastic modulus:

Tester: Tensilon STM-T-100 type, according to JIS K 7203 (unit: kgf/cm$^2$)

6) Weather resistance:

Tester: Sunshinesuperlonglife weatherometer

Condition: Rain at 63° C., no rain at 83° C.

Evaluated from crack occurrence time (hr).

7) Heat aging characteristics:

Tester: Gear-type aging tester

Condition: 150° C. and 160° C.

Evaluated from crack occurrence time (hr).

8) Immersion in hot water:

The above-mentioned physical properties after immersion in boiling water for 48 hours were evaluated.

9) Gel fraction:

This is expressed by the percentage (%) of the weight of a residue obtained by placing a sample in a metal gauze of 500 meshes, followed by reflux in xylene for 6 hours, to the weight of the sample before the test.

EXAMPLE 1

To (A) an ethylene-propylene-ethylidenenorbornene terpolymer having a Mooney viscosity ($ML_{1+4}$ 100° C.) of 88, an ethylene content of 74% by weight and a iodine value of 15, as a soft segment component (2.5 Kg) and (B) a crystalline ethylene-propylene block copolymer having an ethylene content of 7.5% by weight and an MFR (230° C., load 2.16 kgf) of 0.60, as a hard segment component (2.5 Kg), (the total weight of (A) and (B) being 5 Kg), were added (C) 3-methacryloxypropyl-trimethoxysilane as an organosilane compound (100 g), (D) 2,5-di-(t-butylperoxy)hexane as an organic radical-generator (75 g), (E) white carbon (mainly $SiO_2$) (100 g), and Irganox 1010 (Tradename of Ciba Geigy Co., Ltd.) (5 g), BHT (5 g) and calcium stearate (5 g) each as a processing stabilizer, followed by mixing these materials with blending for 2 minutes by means of Henschel mixer or for 15 minutes by means of a tumbler mixer, melt-extruding the resulting mixture by means of a twin-screw extruder (PCM-45 manufactured by Ikegai Tekko Co., Ltd.) at 200° C., pelletizing by means of a mist cutter (PHR 100 manufactured by Ikegai Tekko Co., Ltd.), measuring the melt flow rate (MFR) of the resulting pellets, thereafter injection-molding a test piece for evaluating the physical properties, by means of an injection-molding machine (IS-100 manufactured by Toshiba Kikai Co., Ltd.) under conditions of an injection temperature of 250° C. and a mold temperature of 50° C., and measuring the above-mentioned items 2) to 7). Table 1 shows the polymers of the soft segment component used, Table 2 shows the polymers of the hard segment component, Table 3 shows other components, and Table 4 shows the quantities of these components blended.

EXAMPLES 2-4 AND COMPARATIVE EXAMPLES 1-5

Example 1 was repeated except that the kinds and blended quantities of these components were varied to those shown in Table 4, to carry out pelletization, injection-molding of test pieces and evaluation thereof. The results are shown in Tables 5, 6 and 7.

COMPARATIVE EXAMPLE 6

Example 1 was repeated except that the twin-screw extruder is replaced by a single screw extruder. The results are shown in Table 6.

TABLE 1

| Kind | Type of polymer | Trade name | Name of maker | Mooney viscosity $ML_{1+4}$ 100° C. | Ethylene content (wt. %) | Amount of third component (iodine value) |
|---|---|---|---|---|---|---|
| $A_1$ | Ethylene-propylene-diene terpolymer rubber | EP57P | Japan Synthetic Rubber Co., Ltd. | 24 | 75 | — |
| $A_2$ | Ethylene-propylene copolymer rubber | EP02P | Japan Synthetic Rubber Co., Ltd. | 88 | 74 | 15 |

TABLE 2

| Kind | Type of polymer | Total ethylene amount | First step ethylene amount | Second step ethylene amount | MFR load 2.16 Kgf |
|---|---|---|---|---|---|
| $B_1$ | Crystalline ethylene-propylene block copolymer | 7.5 | — | 59 | 0.60 |
| $B_2$ | Crystalline ethylene-propylene block copolymer | 11.0 | — | 58 | 2.6 |
| $B_3$ | Crystalline ethylene-propylene random copolymer | 3.6 | — | — | 2.0 |
| $B_4$ | Crystalline ethylene-propylene block copolymer | 15.5 | 1.5 | 79 | 2.3 |
| $B_5$ | Propylene homopolymer | — | — | — | 0.80 |

TABLE 3

| Kind | General name | Chemical name | Trade name | Name of maker |
|---|---|---|---|---|
| $C_1$ | Organosilane compound | 3-Methacryloxypropyl-trimethoxysilane | Sila Ace S710 | Chisso Corp. |
| $C_2$ | Organosilane compound | Vinyltriethoxysilane | Sila Ace S220 | Chisso Corp. |
| $C_3$ | Organosilane compound | N-(2-aminoethyl)-3-aminopropyltrimethoxysilane | Sila Ace S320 | Chisso Corp. |
| $C_4$ | Organosilane compound | 3-Glycidoxypropyltri-methoxysilane | Sila Ace S510 | Chisso Corp. |
| D | Organic radical-generator | 2,5-Dimethyl-2,5-di-(t-butylperoxy)hexane | Perhexa 25B | Nihon Yushi Co. |
| E | White carbon | Silicon dioxide | AEROSIL200 | Nihon Aerosil Co. |
| F | Extender oil | (Processing oil) | Diana process PW-380 | Idemitsu Kosan Co. |

TABLE 4

| Example or Comp. ex. | Soft segment Kind | Soft segment Blended amount wt. % | Hard Segment Kind | Hard Segment Blended amount wt. % | Organosilane compound Kind | Organosilane compound Blended amount wt. % | Organic radical-generator D wt. % | White carbon E wt. % | Extender oil F wt. % |
|---|---|---|---|---|---|---|---|---|---|
| Ex. 1 | $A_1$ | 50 | $B_1$ | 50 | $C_1$ | 2.0 | 1.5 | 2.0 | — |
| Ex. 2 | $A_1$ | 50 | $B_1$ | 50 | $C_1$ | 2.0 | 1.5 | — | — |
| Ex. 3 | $A_1$ | 50 | $B_2$ | 50 | $C_1$ | 2.0 | 1.5 | 2.0 | — |
| Ex. 4 | $A_1$ | 50 | $B_2$ | 50 | $C_1$ | 2.0 | 1.5 | — | — |
| Ex. 5 | $A_1$ | 50 | $B_1$ | 50 | $C_2$ | 2.0 | 1.5 | 2.0 | — |
| Ex. 6 | $A_1$ | 50 | $B_1$ | 50 | $C_3$ | 2.0 | 1.5 | 2.0 | — |
| Ex. 7 | $A_1$ | 50 | $B_1$ | 50 | $C_4$ | 2.0 | 1.5 | 2.0 | — |
| Ex. 8 | $A_1$ | 50 | $B_1$ | 50 | $C_1$ | 0.5 | 1.5 | 2.0 | — |
| Ex. 9 | $A_1$ | 50 | $B_3$ | 50 | $C_1$ | 2.0 | 1.5 | 2.0 | — |
| Ex. 10 | $A_1$ | 50 | $B_4$ | 50 | $C_1$ | 2.0 | 1.5 | 2.0 | — |
| Ex. 11 | $A_1$ | 50 | $B_1$ | 50 | $C_1$ | 2.0 | 0.3 | 2.0 | — |
| Ex. 12 | $A_1$ | 50 | $B_1$ | 50 | $C_1$ | 2.0 | 1.0 | 2.0 | — |
| Ex. 13 | $A_1$ | 50 | $B_1$ | 50 | $C_1$ | 2.0 | 1.5 | 2.0 | 25 |
| Ex. 14 | $A_1$ | 50 | $B_1$ | 50 | $C_1$ | 2.0 | 1.5 | 2.0 | 45 |
| Ex. 15 | $A_1$ | 60 | $B_1$ | 40 | $C_1$ | 2.0 | 1.5 | 2.0 | — |
| Ex. 16 | $A_1$ | 80 | $B_1$ | 20 | $C_1$ | 2.0 | 1.5 | 2.0 | — |
| Comp. Ex. 1 | $A_1$ | 50 | $B_1$ | 50 | — | — | — | — | — |
| Comp. Ex. 2 | $A_1$ | 50 | $B_1$ | 50 | — | — | 1.5 | — | — |
| Comp. | $A_2$ | 50 | $B_2$ | 50 | — | — | — | — | — |

TABLE 4-continued

| Example or Comp. ex. | Soft segment Kind | Soft segment Blended amount wt. % | Hard Segment Kind | Hard Segment Blended amount wt. % | Organosilane compound Kind | Organosilane compound Blended amount wt. % | Organic radical-generator D wt. % | White carbon E wt. % | Extender oil F wt. % |
|---|---|---|---|---|---|---|---|---|---|
| Ex. 3 Comp. Ex. 4 | A₂ | 50 | B₂ | 50 | — | — | 1.5 | — | — |
| Comp. Ex. 5 | A₁ | 50 | B₅ | 50 | C₁ | 2.0 | 1.5 | 2.0 | — |

Note: The sum of soft segment and hard segment is 100 wt. %

TABLE 5

| Example or Comp. ex. | MFR g/10 min. load 10 Kgf | 100% Elongation set % | Stress at tensile breaking point Kgf/cm² | Elongation at tensile breaking point % | Stress at 100% Elongation Kgf/cm² | Flexural modulus Kgf/cm² |
|---|---|---|---|---|---|---|
| Ex. 1 | 18 | 42 | 180< | 450< | 94 | 2240 |
| Ex. 2 | 17 | 45 | 150< | 450< | 85 | 2120 |
| Ex. 3 | 5.4 | 37 | 103 | 340 | 76 | 1480 |
| Ex. 4 | 4.8 | 34 | 115 | 360 | 75 | 1220 |
| Ex. 5 | 149 | 41 | 127 | 335 | 87 | 2330 |
| Ex. 6 | 98 | 43 | 148 | 390 | 90 | 2540 |
| Ex. 7 | 350 | 40 | 106 | 275 | 84 | 2340 |
| Ex. 8 | 258 | 46 | 105 | 140 | 78 | 3240 |
| Ex. 9 | 34 | 44 | 146< | 450< | 77 | 2030 |
| Ex. 10 | 4.2 | 42 | 180< | 450< | 90 | 2360 |
| Ex. 11 | 0.24 | 45 | 144< | 450< | 109 | 2380 |
| Ex. 12 | 2.1 | 42 | 176< | 450< | 96 | 2350 |
| Ex. 13 | 30 | 20 | 112 | 330 | 65 | 1300 |
| Ex. 14 | 462 | 13 | 53 | 190 | 44 | 580 |
| Ex. 15 | 2.1 | 32 | 162 | 390 | — | 1360 |
| Ex. 16 | 0.1> | 10 | 55 | 220 | — | 220 |
| Comp. ex. 1 | 5.1 | 48 | 146 | 360 | 133 | 3340 |
| Comp. ex. 2 | 274 | broken | 86 | 149 | broken | 2560 |
| Comp. ex. 3 | 31 | 49 | 112 | 490 | 112 | 2990 |
| Comp. ex. 4 | 254 | 41 | 69 | 520 | 63 | 1530 |
| Comp. ex. 5 | 76 | 51 | 185< | 450< | 99 | 3190 |

TABLE 6

| Example or Comp. ex. | Granulation conditions Name of extruder | Granulation conditions Extrusion temp. °C. | Granulation conditions Extruded amount Kg/hr | Granulation conditions Specific energy Kw·hr/Kg | Gel fraction % | MFR g/10 min. load 10 Kgf | 100% elongation set % | Stress at tensile breaking point Kgf/cm² | Elongation at tensile breaking point % | Stress at 100% elongation Kg/cm² | Flexural elastic modulus Kgf/cm² |
|---|---|---|---|---|---|---|---|---|---|---|---|
| Ex. 1 | Ikegai PCM-45 | 200 | 27 | 0.24 | 59 | 18 | 42 | 180< | 450< | 94 | 2240 |
| Comp. ex. 4 | Ikegai PCM-45 | 200 | 26 | 0.25 | 18 | 254 | 41 | 69 | 520 | 63 | 1530 |
| Comp. ex. 6 | Toshiba SE-65 type | 230 | 27 | 0.07 | 19 | 17 | broken | 195 | 90 | broken | 3100 |

Ikegai PCM-45: twin-screw extender
Toshiba SE-65 type: single-screw extruder

TABLE 7

| Item | | Example 1 | Comparative example 2 | Example 3 | Comparative example 4 |
|---|---|---|---|---|---|
| Weather resistance | 63° C., rain | 300 | 280 | 420 | 280 |
| | 83° C., no rain | 130 | 120 | 220 | 120 |
| Heat aging characteristics | 150° C. | 9 | 8 | 11 | 8 |
| | 160° C. | 3 | 2 | 5 | 0.5 |

As seen from Table 6, in the case of Comparative example 6 where the same blend as in Example 1 was melt-extruded by means of a single-screw extruder, the specific energy and the gel fraction is so lower than those in Example 1 that the rubbery properties (100% elongation set) are deficient.

EXAMPLES 15 AND 16

The components excluding the extender oil among those in Table 4 were blended in the same manner as in Example 1, followed by melt-extruding the resulting blend by means of a twin-screw extruder (PCM-45 manufactured by Ikegai Tekko Co., Ltd.) at 200° C., while injecting an extender oil in a definite quantity through an injection port by means of a pump to obtain pellets of compositions of Examples 15 and 16. Injection molding of test pieces and their evaluations were carried out in the same manner as in Example 1.

As seen from Examples 1–4 and Comparative examples 1–4, the composition of the present invention has been improved in the elongation set and flexural elasticity as compared with simple blend product or product crosslinked with organic peroxide.

As seen from Examples, 1, 9 and 10 and Comparative example 5, when a crystalline ethylene-propylene block copolymer or a crystalline ethylene-propylene random copolymer is used as the hard segment, the elongation set and flexural elasticity are improved.

As seen from Examples 1, 15 and 16, when the quantities of the hard segment and the soft segment blended are in the definite ranges, it is possible to achieve the effectiveness of the present invention.

As seen from Examples 1, 3, 5, 6 and 7 and Comparative examples 1 to 4, the effect of improving the physical properties due to the organosilane compound is evident, and in particular, the improvement effect of 3-methacryloxypropyltrimethoxysilane is notable.

From Examples 1 and 8, the effect of the quantity of the organosilane compound blended is evident, and from Examples 1, 11 and 12, the effect of the quantity of the organic peroxide blended is evident.

As seen from comparison of Examples 13, 14 and 1, the improvement effects of the fluidity in the processing, elongation set and flexural elasticity due to the blending of the processing oil is notable.

With a material obtained by immersing the test piece of Example 1 in hot water for 48 hours and a material obtained by immersing the test piece of Example 2 in hot water for 48 hours, change in the crosslinking due to water with lapse of time was observed. The results are shown in Table 8. The former case is referred to Example 1', and the latter case, Example 2'.

As seen from the results of Table 8, change in MFR is less when white carbon is used. Further, the product obtained by using white carbon formed no blocks due to coagulation processed easily.

C./min.). The following peaks were observed: a peak based on the γ-transition of polyethylene (a large portion of ethylene part of ethylene-propylene block copolymer or ethylene-propylene (diene) copolymer) in the vicinity of −100° C., a peak based on the glass transition of ethylene-propylene (diene) copolymer in the vicinity of −20° C. and a peak based on glass transition of polypropylene in the vicinity of room temperature. When Comparative examples 1 and 2 and Example 1 are compared, it was observed that the peak intensities in the vicinity of −20° C. increase in the order of 0.087 (Comparative example 1), 0.118 (Comparative example 2) and 0.127 (Example 1), and to the contrary the peak intensities in the vicinity of room temperature decrease in this order. In the cases of Comparative example 3 and Example 3, too, the same tendency was observed.

In view of the above facts, it is evident that the composition according to the present invention has been more improved in the elastomeric properties due to the crosslinking.

According to the present invention, it is possible to provide a polyolefin thermoplastic elastomer composition having superior rubbery elasticity and mechanical properties, superior processing fluidity e.g. for injection molding, extrusion molding, etc. of thick products, and superior workability.

What we claim is:

1. A process for producing a polyolefin thermoplastic elastomer composition, comprising the steps of:
   forming a blend of
   (a) 50 to 80% by weight of an ethylene-propylene copolymer rubber and/or an ethylene-propylene-diene terpolymer as a soft segment component,
   (b) 50 to 20% by weight of a crystalline ethylene-propylene block copolymer having an ethylene content of at least 5% by weight and a melt flow index of 0.5 to 30 g/10 minutes and/or a crystalline ethylene-propylene random copolymer having an ethylene content of at least 1.5% by weight and a melt flow index of 0.5 to 30 g/10 minutes as a hard segment, and based upon 100 parts by weight of the total of (a) and (b),
   (c) 0.3 to 5 parts by weight of an organosilane,
   (d) 0.1 to 3 parts by weight of an organic radical-generator exhibiting a half-life period for one minute at a temperature of 170° C. or higher,
   (e) 0 to 100 parts by weight of an extender oil to obtain a resulting blend, and
   (f) up to five parts by weight of white carbon; followed by subjecting the resulting blend to dy-

TABLE 8

| Example or Compar. ex. | MFR g/10 min. load 10 Kgf | 100% elongation set % | Stress at tensile breaking point Kgf/cm$^2$ | Elongation at tensile breaking point % | Stress at 100% elongation Kgf/cm$^2$ | Flexural elastic modulus Kgf/cm$^2$ |
| --- | --- | --- | --- | --- | --- | --- |
| Example 1 | 18 | 42 | 180< | 450< | 94 | 2240 |
| Example 1' | 6.2 | 35 | 167 | 275 | 106 | 2610 |
| Example 2 | 17 | 45 | 150< | 450< | 85 | 2120 |
| Example 2' | 0.22 | 38 | 171 | 300 | 102 | 2440 |

Note: The molded products of Example 1' and Example 2' are samples obtained by subjecting the molded products of Example 1 and Example 2 to immersion in hot water, respectively.

With regard to Comparative examples 1 and 2 and Example 1, test pieces of 10 mm×5 mm×1 mm were prepared by means of an injection molding machine, followed by measuring the loss tangents (tan δ) thereof within a temperature region of −150° to +165° C. by means of a dynamic viscoelasticity-measuring apparatus (DMA 983 type manufactured by Dupont Co., Ltd., resonant frequency mode, temperature-raising rate 5° namic partial crosslinking carried out by using a twin-screw extruder under the conditions of a temperature of 190° C. to 270° C. and a retention time of 20 to 180 seconds in said extruder so that the residue in xylene after reflux for 6 hours is in the range of 20 to 70% by weight in the resultant partially crosslinked composition, a specific energy W of 0.08 to 0.8, expressed by the formula $$W=\sqrt{3}\cdot(I-I_O)\cdot E\cdot \phi /1000\cdot Q$$

wherein W=specific energy (KwHr/Kg), I=loaded current (A), $I_O$ =loaded current at the time of empty-driven screw (A), E=voltage (V), $\phi$=power factor and Q=extruded quantity (Kg/hr).

2. A process for producing a polyolefin thermoplastic elastomer composition comprising the steps of:
forming a blend of
(a) 50 to 80% by weight of an ethylene-propylene copolymer rubber and/or an ethylene-propylene-diene terpolymer, as a soft segment component,
(b) 50 to 20% by weight of a crystalline ethylene-propylene block copolymer obtained by copolymerizing ethylene with propylene at two stages, in the first stage of which an ethylene-propylene copolymer having an ethylene content of 0 to 5% by weight is formed so as to occupy 20 to 95% by weight of the total quantity polymerized, and in the second stage of which an ethylene-polyethylene copolymer having an ethylene content of 50 to 85% by weight is formed so as to occupy 80 to 5% by weight of the total quantity polymerized, said crystalline ethylene-propylene block copolymer having an ethylene content of at least 5% by weight and a melt flow index of 0.5 to 30 g/10 minutes and/or a crystalline ethylene-propylene random copolymer having an ethylene content of at least 1.5% by weight and a melt flow index of 0.5 to 30 g/10 minutes as a hard segment, and based upon 100 parts by weight of the total of (a) and (b),
(c) 0.3 to 5 parts by weight of an organosilane,
(d) 0.1 to 3 parts by weight of an organic radical-generator exhibiting a half-life period for one minute at a temperature of 170° C. or higher,
(e) 0 to 100 parts by weight of an extender oil to obtain a resulting blend, and
(f) up to five parts by weight of white carbon;
followed by subjecting the resulting blend to dynamic partial crosslinking carried out by using a twin-screw extruder so as to give a specific energy W, of 0.08 to 0.8, expressed by the following formula:

$$W=\sqrt{3}\cdot(I-I_O)\cdot E\cdot \phi /1000\cdot Q$$

wherein W=specific energy (KwHr/Kg),
I=loaded current (A)
$I_O$ =loaded current at the time of empty-driven screw (A)
E=voltage (V)
$\phi$=power factor
Q=extruded quantity (Kg/hr).

3. A process for producing a polyolefin thermoplastic elastomer composition comprising the steps of:
forming a blend of
(a) 50 to 80 percent by weight of an ethylene-propylene copolymer rubber and/or an ethylene-propylene-diene terpolymer, as a soft segment component,
(b) 50 to 20% by weight of a crystalline ethylene-propylene block copolymer having an ethylene content of at least 5% by weight in a melt flow index of 0.5 to 30 g/10 minutes and/or a crystalline ethylene-propylene random copolymer having an ethylene content of at least 1.5 percent by weight in a melt flow index of 0.5 to 30 g/10 minutes as a hard segment, and based upon 100 parts by weight of the total of (a) and (b),
(c) 0.3 to 5 parts by weight of an organosilane,
(d) 0.1 to three parts by weight of an organic radical-generator exhibiting a half-life, for one minute at a temperature of 170° C. or higher,
(e) 0 to 100 parts by weight of an extender oil, and (f) up to five parts by weight of white carbon;
followed by subjecting the resulting blend to dynamic partial cross-linking carried out by means of a twin-screw extruder so as to give a specific energy W, of 0.08 to 0.8, expressed by the following formula:

$$W=\sqrt{3}\cdot(I-I_O)\cdot E\cdot \phi /1000\cdot Q$$

wherein W=specific energy (KwHr/Kg),
I=loaded current (A)
$I_O$ =loaded current at the time of empty-driven screw (A)
E=voltage (V)
$\phi$=power factor
Q=extruded quantity (Kg/hr).

4. A process for producing a polyolefin thermoplastic elastomer composition according to claim 3, wherein said organosilane is expressed by the formula RR'SiX$_2$, wherein R represents vinyl group, chloro group, amino group, mercapto group, glycidoxy group or methacryloxy group, X represents methoxy or ethoxy group, and R' represents R or X.

5. A process for producing a polyolefin thermoplastic elastomer composition according to claim 4, wherein said organosilane is at least one compound selected from vinyltrimethoxysilane, vinyltriethoxysilane, 3-aminopropyltriethoxysilane, n-(2-aminoethyl)-3-aminopropyltrimethoxysilane, 3-glycydoxypropyltrimethoxysilane, 3-chloropropyltrimethoxysilane, 3-methacryloxypropyltrimethoxysilane, and, 3-mercaptopropyltrimethoxysilane.

6. A process for producing a polyolefin thermoplastic elastomer composition according to claim 3, wherein said organic radical-generator is at least one compound selected from di-t-butylperoxydiisopropylbenzene, 2,5-dimethyl-2,5-di-(t-butylperoxy)hexane and dicumyl peroxide.

7. A process for producing a polyolefin thermoplastic elastomer composition according to claim 3, wherein said soft segment component is an ethylene-propylene copolymer rubber having a Mooney viscosity $ML_{1+4}$ (100° C.) of 10 to 100 and a propylene content of 20 to 50% by weight, or an ethylene-propylene-diene terpolymer having a Mooney viscosity $ML_{1+4}$(100° C.) of 10 to 110, using as the third component diene to be copolymerized, any one of ethylidene, norbornene and 1,4-hexadiene, and having a iodine value (degree of unsaturation) of preferably 16 or less.

8. A process for producing a polyolefin thermoplastic elastomer according to claim 3, wherein said extender oil is at least one compound selected from paraffin, naphthene or aromatic compounds.

* * * * *